Figure 1A:
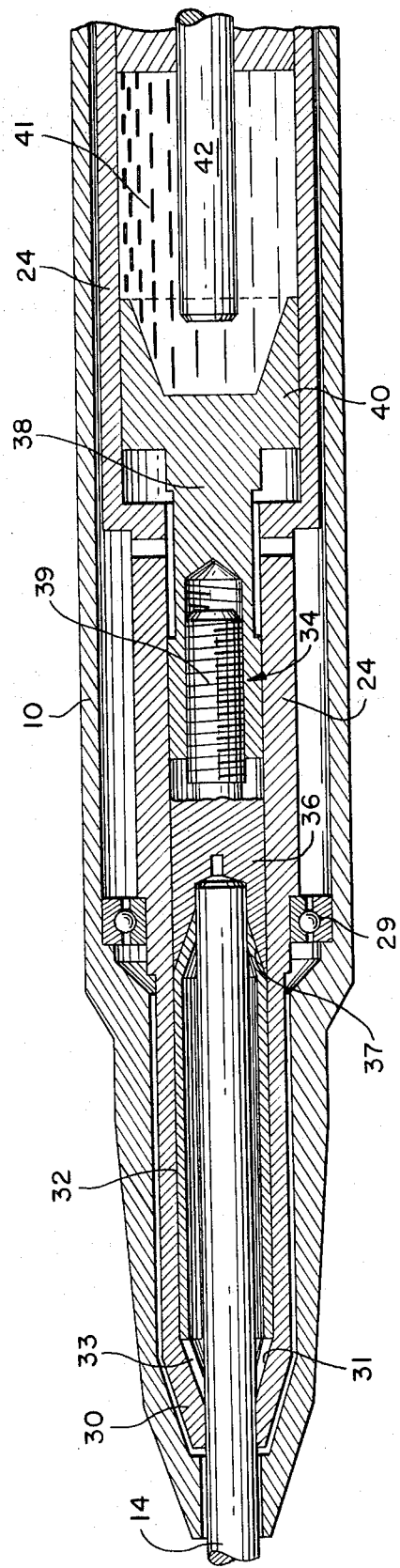

United States Patent [19]

Stewart

[11] 3,763,664
[45] Oct. 9, 1973

[54] DENTAL HANDPIECE
[75] Inventor: James M. Stewart, West Palm Beach, Fla.
[73] Assignee: Stewart Research Inc., West Palm Beach, Fla.
[22] Filed: Apr. 13, 1972
[21] Appl. No.: 243,736

Related U.S. Application Data
[63] Continuation-in-part of Ser. No. 873,976, Nov. 4, 1969, Pat. No. 3,702,067.

[52] U.S. Cl. ............... 64/4, 64/26, 60/54.5 R, 74/583, 32/26
[51] Int. Cl. ............................................. F16c 1/06
[58] Field of Search ............... 64/27 R, 27 NM, 26, 64/4; 60/54.5; 74/583; 32/26

[56] References Cited
UNITED STATES PATENTS
2,008,920   7/1935   Moir ..................................... 64/4
2,900,811   8/1959   Selms .................................... 64/26
3,487,637   1/1970   Newman ......................... 60/54.5 R
3,721,092   3/1973   Schafer .......................... 60/54.5 R Primary Examiner—Charles J. Myhre
Assistant Examiner—Randall Heald
Attorney—Marcus B. Finnegan et al.

[57] ABSTRACT

A dental handpiece including a housing and a collet rotatably mounted within the housing having as a force transmitting means a substantially non-compressible, non-fluid, but readily deformable gel confined within an internal chamber of constant volume but of variable shape to transmit gripping forces to the collet to hold the workpiece in the housing.

7 Claims, 2 Drawing Figures

DENTAL HANDPIECE

This application is a continuation-in-part of application Ser. No. 873,976, filed Nov. 4, 1969 now U.S. Pat. No. 3,702,067.

This invention relates to a new and unique means for transmitting a gripping force to the collet of a dental handpiece. More particularly, this invention relates to the application of materials known as "gels" as a force transmitting means in a dental handpiece. Within the present invention the term "gel" indicates non-compressible materials which perform, as herein utilized, as a solid in the respect of their force transmission, and somewhat as a resilient material, such as rubber, in that their content is mobile or displaceable in all directions, yet capable of returning to a state of repose and continuity when the applied force is relaxed or applied in another direction, or by a different means. The materials themselves may be visualized as being much like a fruit jelly of tough character, or like common Jello; yet in use their internal particle to particle adherence is much higher, thus inherently having the tendency to hold strongly together as a unified mass. As aforesaid, the materials contemplated herein are non-fluid and non-compressible; however, their interparticle-to-particle tenacity may range from relatively weak to very strong while remaining useful in the invention. The invention is described in relation to a particular type of gel, but any similar character gel may be employed, as should be apparent.

In producing useful tools, or work accomplishing devices of any type, many practical considerations are constantly prominent. Apparatus which involves several coacting, interrelated or interfitting moving parts, for example, almost invariably suffer from the disadvantages of heat generation, rapid parts wear, followed by more heat and noise production, gradually degrading operating efficiency, parts breakage, increasing costs in the overall process, equipment downtime, etc. These disadvantages are constantly sought to be overcome by parts elimination, higher quality materials, closer tolerances, lubrication, cooling, product quality compromise, etc., all of which are well known.

When equipment such as dental handpieces are involved, the economic aspect is reflected seriously by the increasing problem of tool wear and obsolescence, since initially such tools, being in the nature of surgical instruments, are expensive, and are used by highly skilled professionals who demand above the ordinary level of quality and performance.

The present invention, therefore, constitutes an improvement in the art of dental handpieces where it is necessary to transmit a collet gripping force to the tip of the handpiece to hold the workpiece in place and to permit rapid and selective disengagement of the force when it is desired to remove or replace the workpiece.

In the past, some attempts have been made to use hydraulic fluids in dental handpieces as a force transmission means. In dental tools, however, containment of the hydraulic fluid against leakage within the tool is very essential and requires parts quality and parts tolerance factors of such high standard as practically to be beyond consideration, either economically or, in fact, operably. For example, when parts wear even slightly, oil or fluid seepage appears either on the hands of the dentist or in the mouth of the patient and contaminates the surgical field. When this occurs, an expensive tool must be discarded, or expensively repaired. Moreover, such fluids are usually corrosive and therefore tool cleaning is a problem. Therefore, dental tools, such as drills, which involve relatively complex associations of many moving parts and generate considerable heat and noise in providing rotary movement of the workpiece, and also axial movement of certain other parts, are especially adaptable to the present invention.

The aforementioned gels transmit force as effectively as do either fluids or mechanical parts; yet, such gels do not flow as fluids. Rather, they are of such a nature as to undergo reshaping, such, as when an element penetrates into the gel volume or as when pressured by an element entering a volume occupied by the gel. To illustrate this, consideration may be given to an assembly such as a cylinder and piston in which the gel material occupies the volume adjacent to the piston. If then the gel is confined at the open end of the cylinder by a confining means which also permits passage therethrough of a penetrating shaft into the body of the gel, it will be immediately understood that the latter means can penetrate into the solid gel only if the volume of the cylinder is enlarged. This is obvious since two solid materials cannot occupy the same space at the same time. Pistons are normally movable within their confining cylinders; and if the force applied to the means entering the gel body is sufficiently high, entry of such means into the gel is permitted by movement of the piston. The confined gel has the property of reshaping itself under pressure to the enlarged, or altered, shape and size of the cylinder. Thus, as the force delivering means enters the gel, the gel reshapes itself to the cylinder volume and in doing so, it moves in the direction of the piston. Accordingly, as the force means enters the gel, the piston moves at the same time in response to the reshaping action of the gel.

It is important to note particles of while hydraulic fluids perform the force transmitting function to the same extent, unrestricted fluid particle movement is permitted by such fluids. In other words it may be said that though a hydraulic fluid may be fairly viscous, indeed it does flow because of its inherent viscosity. In contrast, the gel materials employed in this invention possess no viscosity characteristics applicable herein. Accordingly, the particlesf the gel material are not free to move individually (except possibly at very high temperatures and/or pressures) and, therefore, they cannot detach themselves from the body of the gel and move through minute passageways as can the moving molecules of a hydraulic fluid.

By reason of this fact, the use of such gel materials in dental handpieces affords great advantage where leakage of fluids, such as hydraulic fluids, is a matter to be avoided. It is believed to be likely that many dental handpieces have continued to use mechanical means for force transmission, because of the difficulty of sealing against leakage, as by expensive parts of close tolerance or as by seals which must be continually replaced.

The gel type material of this invention, at least for purposes herein, may be described as a deformable but non-compressible solid. It may be also mentioned that upon withdrawal of the deforming means, such as the force means discussed above from within the body of the gel, the gel returns to its original shape as established by the confining means. The return to its original shape occurs substantially as rapidly as the displacing means is withdrawn.

Normally, it is desirable that the gel material be produced by an in situ chemical reaction which is carried out within the confining volume in which it is intended to operate as the force transmitting component of the handpiece. This assures that the space will be fully occupied and, therefore, that the calculated and needed displacement of the collet will take place.

A specific gel product, especially useful according to this invention, is that which is sold under the Trademark SYLGARD 51 Dielectric Gel. The named material is produced by the Dow Corning Corporation, Midland, Michigan, and it is particularly described in their Bulletin No. 05-2043, dated December 1967, which Bulletin is made a part of this disclosure. According to this bulletin, this particular product is a silicone product which is produced by catalytic action. The silicones are well known materials and they can be produced with a variety of characteristics according to known techniques. By varying the degree of reaction, in the production of SYLGARD 51, products may be produced ranging from products which are easily deformable to products which resist deformation strongly. As will be appreciated, any one of these obtainable materials can be employed according to this invention. Of course, as the materials are more resistant to deformation, more force will need to be employed in overcoming such resistance. Usually, the more resistant materials are increasingly tolerant of temperature effects and accordingly they afford advantages in higher temperature environments.

Gels which are useful in this invention are described in and may be produced according to the teachings of U. S. Pat. No. 3,020,260 of Feb. 6, 1962. It will be understood that the invention is concerned with gel materials having the general character hereinbefore described and that the invention is not particularly concerned with gel characteristics other than such as may be regarded as functional. Thus, any gel having the functional characteristics applicable to the purposes of this invention may be employed regardless of their chemical content.

Figure 1B:
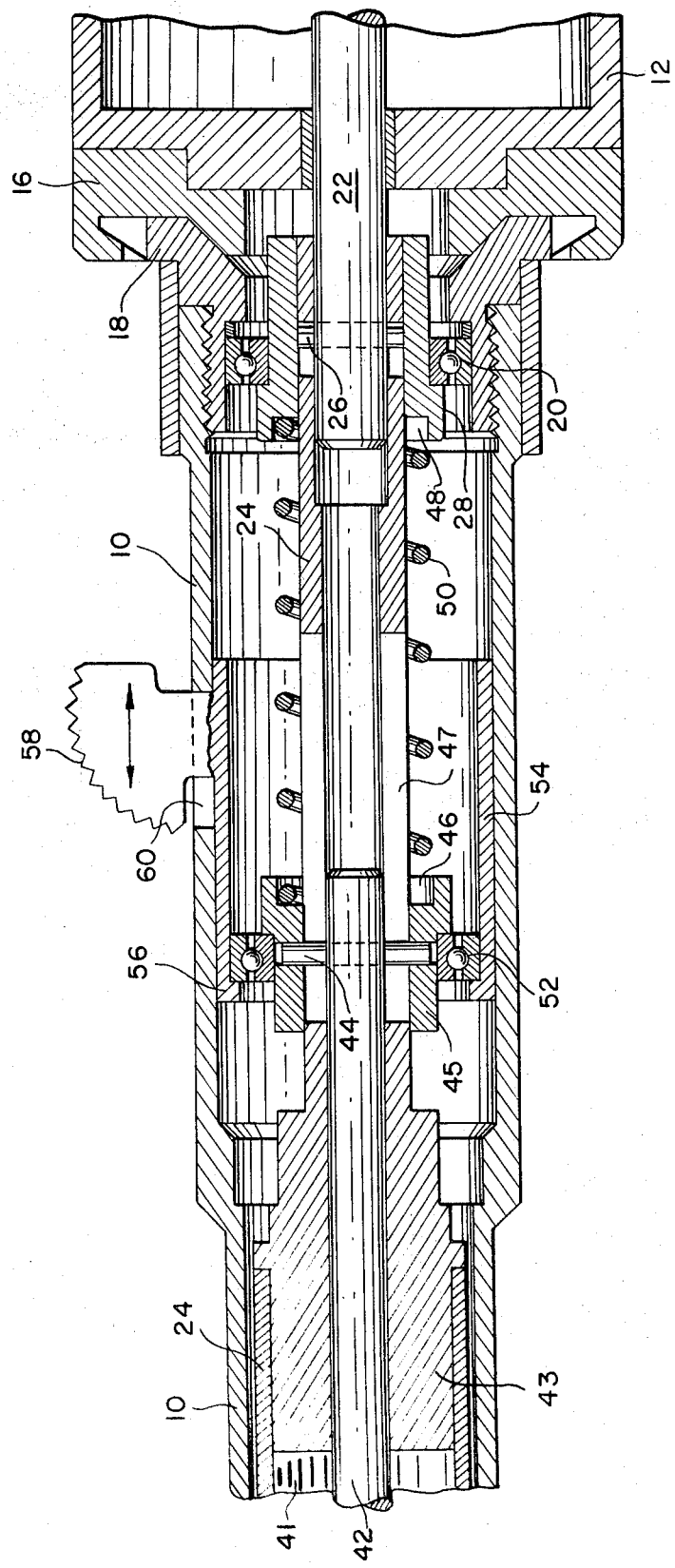

The invention herein is illustrated by drawings wherein:

FIGS. 1A and 1B are longitudinal sectional views through a dental tool which may receive any type of workpiece for operation by the tool mechanism.

Referring to the drawings, numeral 10 denotes the outer metal housing of the dental tool. Numeral 12 denotes a driving motor and numeral 14 denotes the driven workpiece. The motor is attached to the housing by means of cooperating elements 16 and 18 providing a bayonet type lock, permitting easy release. Element 18 is a cylindrical piece threading into housing 10 and its inner surface provides a surface for a rear bearing assembly 20. Numeral 22 denotes the driving shaft of the motor which is keyed to a driven, elongated and hollow sleeve 24 by a pin 26. Another sleeve 28 frictionally engages the rear end of sleeve 24 and is supported for rotation therewith by bearing assembly 20.

Elongated sleeve 24 extends to the extreme opposite end of the tool and is rotatably supported at the front of the housing by a forward bearing assembly 29.

Within the hollow interior of sleeve 24 are located the parts for holding the workpiece 14 and effecting its rotation through frictional contact. At the front end of sleeve 24 there is an internal and rearwardly extending camming surface 31. A collet 32 is slidably mounted within sleeve 24 and, as conventional in dental handpieces, collet 32 has a plurality of resilient jaws with forwardly extending camming surfaces 33 shaped for cooperation with camming surface 31. Thus, as collet 32 is urged forward within sleeve 24, the jaws are flexed inward to grip workpiece 14 and retain it for rotary movement within the housing.

In accordance with the invention, collet operating means are provided for urging collet 32 forward against camming surface 31. As embodied, and as shown in FIG. 1A, the collet operating means comprises a collet shaft generally 34 mounted for slidable movement within sleeve 24. Collet operating shaft 34 includes a forward portion 36 engageable at 37 with the rear end of collet 32 and a rear portion 38 threadably connected at 39 to forward portion 36 to permit overall length adjustment in the collet operating shaft.

In accordance with the invention, rear portion 38 of collet shaft 34 terminates in a forward piston means slidably mounted within the front end of internal chamber 41 in sleeve 24. As embodied and as shown in FIG. 1A, the forward piston means comprises a piston head 40 integral with collet shaft portion 38 and slidably mounted adjacent the inner wall of sleeve 24. Further, rear piston means are provided at the opposite end of chamber 41 and spaced rearwardly from piston head 40 thus defining a confining volume within chamber 41 between the piston means. As embodied and as shown in FIGS. 1A and 1B, the rear piston means comprises a piston rod 42 slidably mounted within a thickened head portion 43 of sleeve 24 and having a cross section or diameter smaller than the cross-sectional dimension of chamber 41. As best shown in FIG. 1B, piston rod 42 is keyed to sleeve 24 by a pin 44 journaled in an outer sleeve 45 so that piston 42, as well as sleeve 45, rotates with sleeve 24. Pin 44, however, rides in a pair of parallel slots 47 in sleeve 24 to permit relative axial or sliding movement between piston rod 42 and sleeve 24.

In accordance with the invention, spring means are provided for generating the required force for operating collet 32. As embodied, the spring means comprises a coil spring 50 located between sleeves 45 and 28, which are provided with annular flanges 46 and 48. Spring 50 serves to maintain strong axial pressure on piston rod 42 via sleeve 45 and pin 44, such pressure affecting the needed constant force on collet operating shaft 34, whereby collet 32 is caused to tightly and frictionally grip workpiece 14.

Numeral 52 denotes a bearing assembly mounted on sleeve 45, the inner ring thereof rotating with sleeve 45 by reason of tight frictional engagement and the outer bearing ring being frictionally held within a sleeve 54 adjacent an inwardly extending flange 56.

In accordance with the invention, control means are provided for selectively retracting spring 50 to permit release of a workpiece from collet 32. As embodied, the control means includes sleeve 54 which is axially slidable in housing 10 by a finger or thumb actuator 58 that extends through a slot 60 in the housing. Manual axial movement of thumb piece 58 effects compression of spring 50 and, therefore, its effective force or pressure on the other part in the assembly. Thus, movement of the thumb piece to the right as indicated by the arrow effects withdrawal of piston 42 from the gel material and, accordingly, the force transmitted to collet 32 is relieved and the workpiece is readily removed.

It is desired to point out that the tool illustrated herein permits removal of the workpiece without stopping the rotation of the motor and assembled parts. Thus, a number of dental tools may be operated from a common power source and workpieces may be removed from any one of the operating tools while the others are permitted to continue in normal operation.

Reference is now made to a very important advantage not heretofore mentioned in the course of describing this invention. This particular advantage has to do with reduction in the necessary force of the spring 50 of the device by which the internal mechanism is caused to compress the collet structure and strongly grip the working piece. Prior art dental tools of the general type here under consideration have suffered from substantial disadvantage in that stronger spring pressure than desirable usually is necessary, considering the fact that the collet must be released by hand against the spring force. Surprisingly enough, such spring pressure does, indeed, present a problem to the dentist. To some extent the prior art has been able to reduce spring pressure by mechanical elements affording advantage by the well-known principle of leverage. However, the mechanical apparatus employed for this purpose can seldom be positioned in such a fashion as to be perfectly balanced as a matter of concentricity within the tool and, therefore, considerable vibration is developed, together with noise and heat which, obviously, is undesirable. In using the gel of this invention, together with the mechanical elements described hereinbefore, it is possible to employ a relatively weak spring which may be easily released by thumb pressure while, at the same time, sufficient force is delivered at the points of compression of the collet that the working piece is very securely held. The fundamental principle by which such a high degree of mechanical advantage is attained as a result of this invention is known as Pascal's principle, which principle is applicable in hydraulic fluids. As applied to hydraulic fluids, briefly stated, the principle is that an increase in pressure at any point in the liquid results in a like increase at every other point in the liquid. In actual application, upon applying a force of a given magnitude to a small piston, a greater force will be exerted by a larger piston interconnected by a hydraulic fluid. The formula is stated as $F/A = f/a$. By this means a large force, exerted through a small distance, may be obtained by exerting a small force through a large distance. Although the present invention does not employ a hydraulic fluid, it is highly advantageous to the present invention that the gel materials respond entirely similar in the respect involving Pascal's principle. As will be seen by observing the drawings, the structure includes a force delivering piston 42 which is quite small in relation to the piston 40 which actually delivers force to collet 32. In actual construction, the ratio of the area of the two pistons is 1:10; however, obviously, the invention is not limited to such ratio. This is considered to be an important distinguishing feature of the present invention entirely aside from all of the other advantages heretofore discussed.

The invention in its broader aspects is not limited to the specific details as shown and described and departures may be made from such details without departing from the principles of the invention and without sacrificing its chief advantages.

What is claimed is:

1. A dental handpiece including a collet for holding a workpiece, means for operating the collet in response to applications of a translational force, spring means for generating said force, and force transmitting means intermediate the spring means and the collet operating means permitting intermittent transfer of the force to the collet operating means, said force transmitting means comprising:
   a. forward and rear piston means defining a movable, but confining volume between the spring means and the collet operating means; and
   b. a solid, non-fluid, non-compressible, but deformable gel fully occupying said confining volume, whereby intermittent applications of translational force, applied to the rear piston means by the spring means, are transmitted through the gel by the forward piston means to the collet operating means.

2. The handpiece of claim 1, wherein the rear piston means is connected to the spring means and includes a piston rod mounted for penetration into the confining gel volume upon applications of translational force from the spring means to increase the mechanical advantage of the transmission of the force from the spring means to the collet operating means.

3. The handpiece of claim 2, wherein the piston rod and gel are related according to Pascal's principle of forced transmission.

4. In a dental handpiece:
   a. a housing;
   b. a sleeve rotatably mounted within the housing and having a collet camming surface on the front end of the sleeve;
   c. a collet slidably mounted within said sleeve, said sleeve having a bore for receipt of a workpiece and resilient jaws cooperating with the collet camming surface to grip the workpiece when the collet is urged forward in the sleeve;
   d. a collet operating shaft slidably mounted within said sleeve, said shaft engaging the collet at one end and having a forward piston means at the opposite end;
   e. rear piston means rearwardly spaced from said forward piston means within the sleeve and defining an internal chamber between said piston means;
   f. a solid, non-fluid, non-compressible, but deformable gel fully occupying the volume of said chamber; and
   g. spring means urging said rear piston means and gel forward to urge the collet forward and compress the collet jaws.

5. The handpiece of claim 4, wherein the rear piston means comprises a piston rod slidably mounted within said sleeve and of smaller cross section than the internal cross section of the chamber, whereby the piston rod penetrates into the gel upon application of force from the spring means to increase the mechanical advantage of the force transmitted to the collet operating shaft.

6. The handpiece of claim 4, including control means for selectively releasing the workpiece from the collet.

7. The handpiece of claim 6, wherein the spring means comprises a coil spring rotatable with the sleeve and continuously urging the piston rod forward, and the control means comprises an operator-controlled actuator for selectively retracting the spring to release the collet and permit the workpiece to be withdrawn.

* * * * *

UNITED STATES PATENT OFFICE
CERTIFICATE OF CORRECTION

Patent No. 3,763,664            Dated October 9, 1973

Inventor(s) James M. Stewart

It is certified that error appears in the above-identified patent and that said Letters Patent are hereby corrected as shown below:

Claim 4, column 6, line 35, change "sleeve" to --collet--.

Signed and sealed this 9th day of April 1974.

(SEAL)
Attest:

EDWARD M. FLETCHER, JR.          C. MARSHALL DANN
Attesting Officer                 Commissioner of Patents